United States Patent [19]

Burnett

[11] 4,024,446

[45] May 17, 1977

[54] MOTOR CONTROL

[75] Inventor: James E. Burnett, Derry, N.H.

[73] Assignee: Automation Industries, Inc., Los Angeles, Calif.

[22] Filed: Apr. 1, 1975

[21] Appl. No.: 564,148

[52] U.S. Cl. .............................. 318/685; 318/640; 318/313

[51] Int. Cl.[2] ...................................... H02K 29/00

[58] Field of Search .................. 318/313, 640, 685

[56] References Cited

UNITED STATES PATENTS

| | | | |
|---|---|---|---|
| 3,193,744 | 7/1965 | Seward | 318/640 X |
| 3,374,410 | 3/1968 | Cronquist et al. | 318/685 |
| 3,414,786 | 12/1968 | Kasmer et al. | 318/685 X |
| 3,426,258 | 2/1969 | Van Pelt | 318/640 |

*Primary Examiner*—Gene Z. Rubinson

[57] ABSTRACT

A stepping motor is simulated by controlling the orientation of a servomotor's shaft with a control feedback circuit that generates a control signal based upon signals from an optical shaft encoder. The encoder includes a rotary light mask having symmetrically arranged transparent and opaque regions which move across the axes of paired, fixed, optical channels. The two channels of each pair are angularly disposed around the axis of the light mask such that, whenever the light fluxes striking both channels' detectors are changing, one will be increasing and the other decreasing. The analog control signal is generated as the difference of the voltage outputs of paired detectors.

18 Claims, 8 Drawing Figures

MOTOR CONTROL

BACKGROUND OF THE INVENTION

The present invention relates to apparatus which simulates the operation of a stepping motor and, more particularly, to an improved shaft encoder and control feedback circuit which can be employed with a servomotor to simulate the operation of a stepping motor.

The stepping motor has, in recent years, become a basic building block of computer controlled sytems. Modern high performance systems, however, have increased the peformance requirements of stepping motors in terms of higher speeds, higher accelerations, faster settling times, controlled response, higher efficiency, and elimination of resonance phenomena. With conventional stepping motors, some of these performance requirements can be attained only at great expense. Others cannot be attained at all.

Heretofore, optical shaft encoders have been predominantly of two basic types. In one, an opaque disk having transparent regions moves between a light source and a detector. In the other, two such disks are provided, as is a technique of determining average light flux transmitted through the disk pair at predetermined fixed locations with respect to the disk axes. In attempting to apply either type encoder to the problem of simulating a stepping motor, both are found wanting. The former generates a discontinuous feedback signal (e.g., a digital pulse train or binary code), since it inherently includes a deadband of one pulse either side of the desired null. This inherent defect is particularly troublesome near the null location (i.e., the rotational orientation of the disk which should define of the next step of the simulated stepper). The alternative encoders, employing paired disks having unequal slots or displaced axes, are limited in the number of steps which can be defined in a single revolution. Furthermore, when few steps are desired within a revolution, the averaging of light to adjacent slots, and thus the intended direction of rotation, may become indeterminate.

In view of the foregoing, it is a principal object of the present invention to provide apparatus which simulates the operation of a stepping motor and which can achieve better performance characteristics than conventional stepping motors.

SUMMARY OF THE INVENTION

According to the present invention a specially designed optical shaft encoder and a control feedback circuit cooperate to control the shaft position of a servomotor. The encoder's plural optical channels are arranged in pairs which are positioned, with respect to an intermediate rotary light mask (e.g., a slotted disk), such that when the light flux striking one channel's detector of the pair is increasing, the light flux striking the other detector of the pair always will be decreasing, and vice versa. The detector outputs are retained in analog form and are combined (e.g., subtracted) to generate an error signal, which is fed to the servoamplifier. Thus, a precise null location may be determined with almost zero deadband and with an accuracy of a small percentage of one step.

More particularly, apparatus according to the present invention for controlling and moving an electrical motor's rotary member comprises a plurality of optical channels each including a source of light and a detector that produces an output voltage varying in a predetermined way with changes in the light flux striking the detector. A rotatable light mask, linked to the electrical motor's rotary member for rotation therewith, is disposed intermediate the source and detector of each of the optical channels. The mask comprises a plurality of alternating transparent and opaque regions which are disposed symmetrically about the mask's axis of rotation. Control means receive the output voltage of each detector and cause operation of the electrical motor (i.e., rotation of its rotary member) until a first predetermined set of detector outputs occurs and, after a predetermined time lapse, cause operation of the motor until a second predetermined set of detector outputs results, and continuously cause a series of such alternating rotations and time lapses. The optical channels are paired. The detectors of each pair of channels are angularly spaced apart, with respect to the light mask axis, by a predetermined angle chosen such that, at all times when the output voltage of each detector is changing, the output voltage of one will be increasing and the output voltage of the other will be decreasing.

Preferably, in such apparatus, the transparent, as well as the intermediate opaque, regions of the light mask subtend equal angles at the mask axis, and the predetermined angle of detector separation is approximately $$\theta = S(2n + 1),$$

where $S$ = the angle subtended at the light axis by each of the regions, and $n = 0, 1, 2, 3, \ldots$.

It is also preferred that each predetermined set of detector outputs includes equal outputs from the detectors of two paired optical channels; that the motor is a servomotor and the control means include means to subtract the smaller from the larger detector output voltage of two paired optical channels and to cause the resulting difference voltage to operate the servomotor; that there are first and second pairs of optical channels, each detector of the second pair being angularly spaced from a detector of the first pair by an angle of approximately $$\phi = S(n + \tfrac{1}{2});$$

and that the control means can generate the difference voltage from each pair of detector outputs, can generate the inverted voltage of each such difference voltage, and include switching means for serially selecting the individual difference voltages and the individual inverted difference voltages in a predetermined time sequence.

In the manufacture of high performance simulated steppers, minor component variations from the design optimums can result in a failure to meet the performance requirements. It is thus also preferred that the apparatus further include compensating means for altering the angular orientation of the mask at which at least one of the aforementioned predetermined sets of detector output will result. The compensating means may comprise means for altering the intensity of light emitted from at least one of the sources of light, may comprise a variable gain amplifier connected to amplify the voltage of one of the detector outputs, or may comprise an adjustable collimator for varying the margins of the light path by which light reaches at least one of the detectors.

Other objects, features, and advantages of the invention will appear from the following description of a particular preferred embodiment, which is illustrated in the accompanying drawings.

DETAILED DESCRIPTION OF A PARTICULAR PREFERRED EMBODIMENT

DETAILED DESCRIPTION OF A PARTICULAR PREFERRED EMBODIMENT

Figure 1:
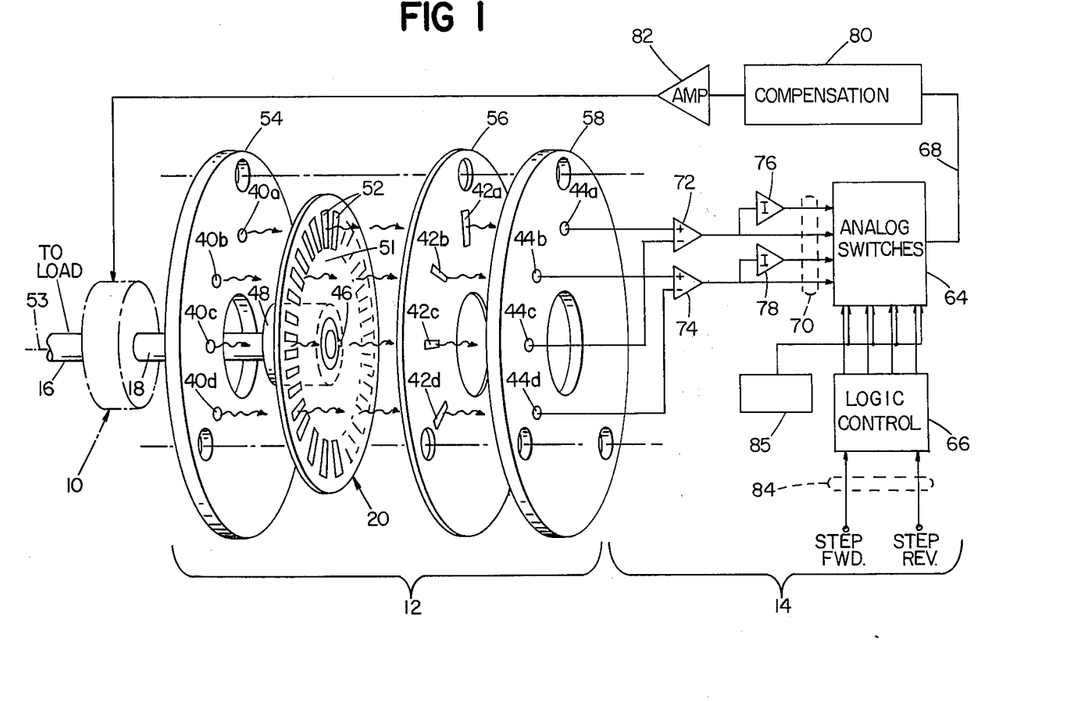
FIG. 1 is a schematic illustration of apparatus constructed according to the present invention for simulating the operation of a stepper motor.
Figure 2:
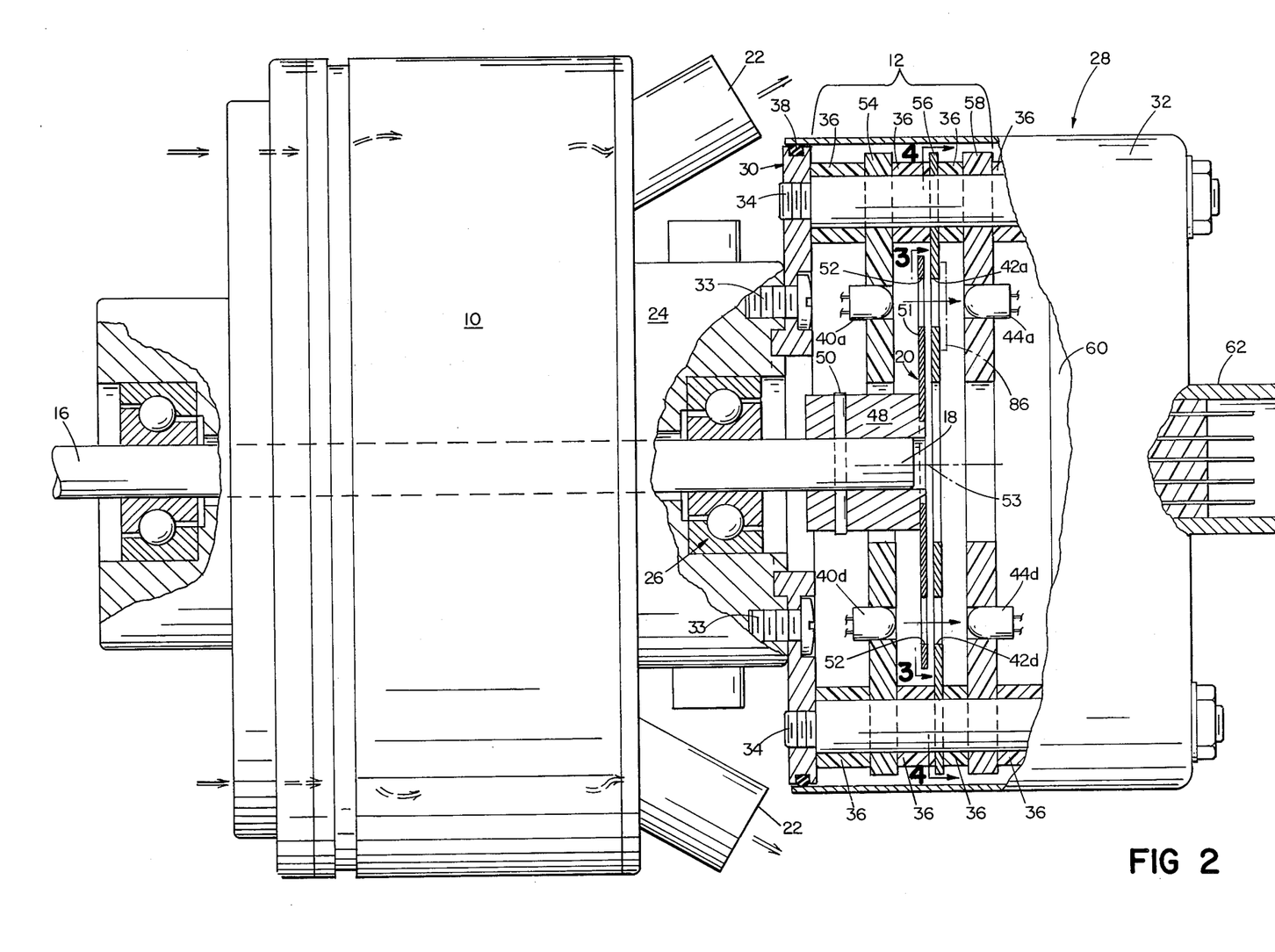
FIG. 2 is a partially broken away side elevation of a servomotor and a shift encoder constructed according to the present invention.

Referring to FIGS. 1 and 2, the apparatus includes a servomotor 10, an optical shaft encoder 12, and control means 14 in the form of an electrical feedback loop, which delivers a drive signal to the servomotor 10.

As illustrated in both FIGS. 1 and 2, the servomotor 10 includes shafts 16, 18 secured to the rotary member (not shown) of the motor and to, respectively, the load and a rotary light mask 20 of the encoder 12. The servomotor 10 is of a conventional design and includes provision for the drawing of cooling air through inlet ports (not shown) and exhausting the air through outlet ports 22. (The general path of the cooling air is indicated by arrows in FIG. 2.) An adapter member 24 is secured to the rear face of servomotor 10 and engages the shaft 18 through a bearing unit 26. An enclosure 28, comprising a base plate 30 and a cover 32, is secured to the adapter 24 by means of screws 33. The base plate 30 supports, and the cover 32 protects, the shaft encoder 12 as well as elements of the feedback circuit. Elements of the encoder 12 and the circuitry are supported on a series of plates or disks within the enclosure 28. These disks are supported on bolts 34, with spacers 36 intermediate adjacent disks to provide the appropriate separation of disks. The bolts 34 extend from an end surface of the cover 32 to the base plate 30 and also serve to secure cover to the base plate. A resilient seal member 38 around the periphery of base plate 30 engages the cover 32 to isolate the contents of the enclosure 28.

The optical shaft encoder has four optical channels defined by elements fixed with respect to the shaft 18. Each optical channel includes a light source 40, a collimator (in the form of a transparent slot 42 in an opaque disk), and a light detector 44. The subscripts $a, b, c, d$ are used in the drawings to indicate the individual elements of four separate optical channels A, B, C, and D. As discussed in detail below, channels A and C and channels B and D are paired, both as to the angular location of the channels with respect to the axis of shaft 18 and as to the use which is made of the output voltages of the detectors 44. Those detectors include photosensitive devices which have an output varying in a predetermined way (e.g., proportionally) with the light flux striking the detector. The light sources 40 are most conveniently provided in the form of light emitting diodes (LED's). A ground glass cap (not shown) over each LED assures emission of light parallel to shaft 18 despite any asymmetry in the LED's light emission pattern.

Figure 3:
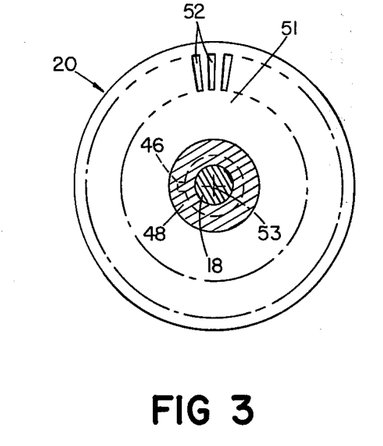
FIG. 3 is a plan view of a slotted-disk light mask employed in the encoder illustrated in FIGS. 1 and 2.

The rotary light mask 20 is secured, through key 46, collar 48 and pin 50, to the shaft 18, and is disposed intermediate the light source 40 and detector 42 of each optical channel for rotation in a plane substantially perpendicular to the optical axes of those channels. As best seen in FIG. 3, the light mask 20 is in the form of an opaque disk 51 provided with a plurality of slots 52 symmetrically arranged at a predetermined distance from the axis of rotation 53 of the mask 20. As will be understood from the discussion below, the number and the angular size of the slots 50 will be dictated, in part, by the number of steps per revolution which the simulated stepper is to achieve. In one particular preferred embodiment, the disk 51 has 50 slots each subtending an angle of 3.6° at the axis of rotation 53 and each being separated from adjacent slots by opaque regions which also subtend an angle of 3.6° at the axis 53. The elements defining the optical channels (i.e., sources 40, collimator slots 42, detectors 44) are supported on plates 54, 56, and 58, respectively, each disposed on a plane parallel to the plane of rotation of the rotary light mask 20. Other plates (e.g., plate 60 of FIG. 2) may be provided within enclosure 28 for supporting circuitry, including both the feedback loop and power supplies for both the light sources 40 and the detectors 44. An electrical connector 62 provides an interface with power supplies and any circuitry exterior of the enclosure 28.

If, as is preferred, the rotary light mask 20 has opaque and transparent sectors of equal size, the two optical channels of each pair are spaced apart around the axis of the shaft 18 by an angle of $$\theta = S(n + 1)$$

where $S$ = the angle subtended at the axis by each of the opaque and transparent sectors and where $n = 0, 1, 2, 3, \ldots$ With this relationship, when one of the optical channels of a pair (e.g., channel A) is aligned with the leading edge of a slot 50, the other optical channel of the pair (e.g., C) will be aligned with the trailing edge of another slot 50. Thus, as the light mask 20 rotates, the light flux transmitted to the detectors of the paired channels will be out of phase. That is, when the light flux striking one of the paired detectors, and thus its output voltage, is increasing, the light flux striking the other detector of the pair, and thus its output voltage, will be decreasing.

Not only are channels of each pair related angularly, but the pairs themselves have a predetermined relationship. Each optical channel of the second pair (i.e., channels B and D) is angularly spaced from one of the channels of the first pair by an angle $$\phi = S(n + \frac{1}{2}).$$

As discussed in detail below, according to the invention the step locations in the rotation of shaft 18, and thus light mask 20, are defined by those orientations in which the output voltages of the detectors of two paired optical channels are equal (i.e., the difference voltage of those outputs is a null). With the above angular relationship of the second pair of channels relative to the first pair of channels, when the difference voltage of one pair yields a null, the difference voltage of the other pair (or its inverse) will be at a maximum. This provides a convenient system for continuous stepping, since one need only provide a switching arrangement in which the various difference voltages are selected in a timed sequence for delivery to the servomotor driving or controlling circuitry (e.g., the servoamplifier).

Referring to FIG. 1, the control means 14 comprise an analog switching system 64 which, controlled by suitable logic circuitry 66, selects each of four inputs 70 in sequence for transmission to the switching system output 68. Each of the inputs consists of a difference voltage generated by subtracting the output voltage of one channel of a pair from the output voltage of the other channel of that pair. The primary difference voltages (i.e., channel A voltage minus channel C voltage; channel B voltage minus channel D voltage) are generated by amplifiers 72 and 74 which are connected to receive, respectively, the outputs of detectors 44a and 44c and of detectors 44b and 44d. Amplifiers 76 and 78 invert the difference voltages produced by amplifiers 72 and 74, respectively, to provide the remaining two difference voltage inputs for the switching system 64. The output 68 of the switching system 64, after passing through a compensating circuit 80, is delivered to the servoamplifier 82 which, of course, controls the rotation of the servomotor's rotary member (not shown). The logic 66 is constructed to operate the individual switches of switching system 64 in a predetermined repeating sequence. One such repeating sequence of inputs are those provided by amplifiers 72, 74, 76, 78, 72, . . . . The logic 66 also includes a pair of inputs 84 for choosing the direction of step-wise rotation which will be produced by selected sequence of difference voltages transmitted to the servoamplifier 82. The circuit 80 is conventionally constructed to compensate for frequency dependent time delays in the feedback loop. A discussion of such circuits, often called "equalizers," is found in Bower et al., *Introduction to the Design of Servomechanisms* (John Wiley & Son, 1958), p. 166 –7. Circuit 85, discussed further below, electronically modifies the feedback signal passed to the switch output 68 so as to enhance the dynamic range of the simulated stepper.

As suggested above, the preferred choice of detector outputs for defining a step in the rotation of shaft 18, and light mask 20, consists of those locations at which the channel outputs of a given pair of channels are equal and, thus, at which the signal transmitted to the servoamplifier 82 is zero.

The operation of the simulated stepping motor will, of course, be cyclic and continuous. To describe this operation it is assumed that the sequence is examined from the midpoint of an incremental rotation between adjacent stop positions in the step-wise rotation of shaft 18. The orientation of the light mask 20 relative to the optical channels A and C is such that the output of detector 44a is initially larger than that of detector 44c but is decreasing, while the output of detector 44c is increasing. The logic 66 has caused the switching system 64 to transmit the output of amplifier 72 to the servoamplifier 82. The difference voltage transmitted to servoamplifier 82 is thus positive, but decreasing. This voltage causes the rotation of the servomotor's rotary member until an orientation of light mask 20 is reached whereat the outputs of detectors 44a and 44c are equal. At this "null location" in the rotation of light mask 20, the difference voltage will be zero and thus the input to servoamplifier 82 will be zero. The result is the cessation of the rotation of the shaft 18.

After a predetermined time lag, a pulse is delivered to one of inputs 84 that activates the logic to cause the switching system 64 to disconnect the output of amplifier 72 from its output 68 to connect the output of amplifier 74 to its output 68. Because of the angular relationships between the channels A and B and channels C and D (e.g., the angle $\phi$, discussed above), the output of amplifier 74 will be a positive difference voltage at the time the output of amplifier 72 is zero. This difference voltage generated by amplifier 74 is, of course, transmitted to servoamplifier 82 and this positive signal thus causes the renewed operation of the servomotor and a consequent rotation of shaft 18 and light mask 20, with an attendant decrease in the output of detector 44b and increase in the output of detector 44d. The rotation continues until the detectors 44b and 44d have equal outputs, at which time the drive signal passed to the servoamplifier 82 will again be zero. This incremental rotation of the light mask 20, however, also causes changes in the light flux striking the detectors 44a and 44c so that, when the output of amplifier 74 is zero, the output of amplifier 72 will be a negative difference voltage (i.e., the output of detector 44c has continued to increase and is now greater than the output of amplifier 44a, which has continued to decrease). After another time lapse, the logic 66 causes switching system 64 to transmit the output of amplifier 76, thereby producing another incremental rotation in the manner just described. The subsequent selection of amplifiers 78, 72, 74, etc. results in the continuous step-wise rotation desired. Since each pair of channels can generate two null locations (normal and inverted difference voltages) for each slot 50 of the rotary light mask 20, the number of steps per revolution will in general be twice the number of pairs of channels times the number of slots in the rotary light mask.

In the manufacture of apparatus as described above, there are several sources of potential error which can combine to give a finite error in the null locations. With the apparatus of the present invention, however, the resulting error may be eliminated by compensating for it. In fact, later compensation adjustments, which may be necessary owing to deterioration of system components (e.g., a long-term decay of light source intensity or detector sensitivity), may even be made. Since the encoder operates by balancing light intensities, gain adjustments in the supply voltages for light sources or changes in the detector sensitivities, as well as gain adjustments in the individual electronic channels of the feedback loop, may be employed to compensate for errors, whatever the source.

Figure 4:
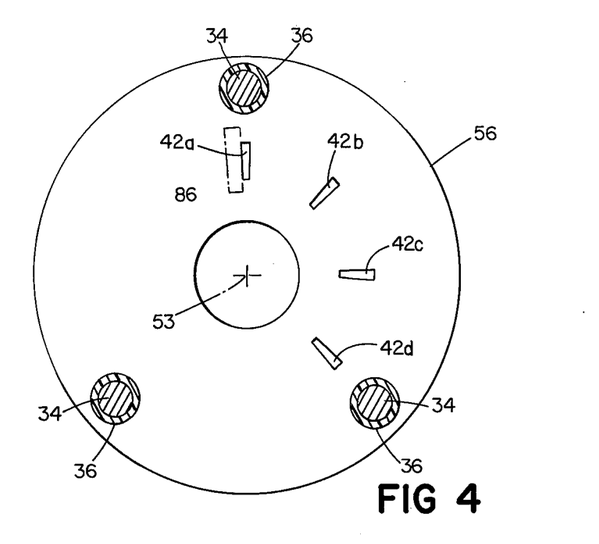
FIG. 4 is a plan view of light collimator (e.g., a fixed-disk light mask) employed in the encoder of FIGS. 1 and 2.

The balancing of the optical channels may also be accomplished by small-scale adjustments in the precise size and location of the individual collimating slots 42. These adjustments would change the light flux striking the given detector for any given orientation of the rotary light mask 20. Such adjustments could be accomplished by simply choosing a plate 56 with appropriately located slots 42. Alternatively, individual slots 42 could be adjusted by the provision of a compensating plate 86 (see FIGS. 2 and 4) mounted on the plate 56.

Figure 5:
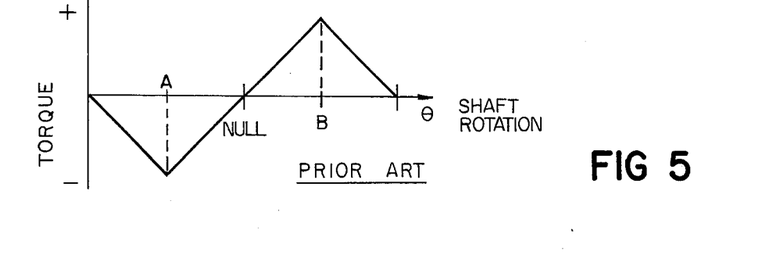
FIG. 5 is a graph of the "dynamic range" of a typical prior art stepper.
Figure 6:
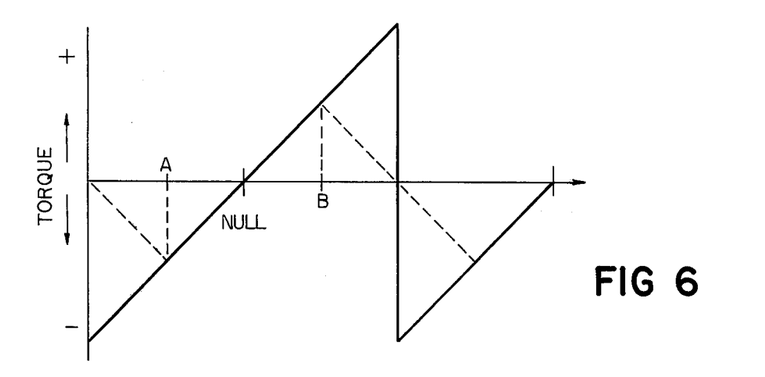
FIG. 6 is a graph of a simulated stepper's dynamic range as electronically modified according to the present invention.

An additional benefit of the simulated stepper according to the present invention is the ability to electronically enhance the dynamic range of the simulated stepping motor. The dynamic range (i.e., the "torque vs. shaft position" curve) of a conventional stepper is a fundamental characteristic of the motor and cannot be modified or extended without completely redesigning the motor. In the apparatus of the present invention, however, this characteristic is easily modified by a suitable circuit 85 (see FIGS. 1 and 7B). A torque vs. shaft position curve for a conventional stepper, illustrated in FIG. 5, indicates that, as the shaft is rotated from a null location, the torque is in a direction forcing the shaft back toward the null. At points A and B in FIG. 5 the curve breaks and is thus non-linear. Thus, for practical purposes, the dynamic range is limited to the curve between points A and B. With the apparatus of the present invention, however, the feedback circuitry need only determine whether the shaft is within the region A-B or outside of this region and, by inverting the signal and adding a constant of twice the peak amplitude thereto, the dynamic range can be effectively doubled as illustrated in FIG. 6.

Figure 7A:
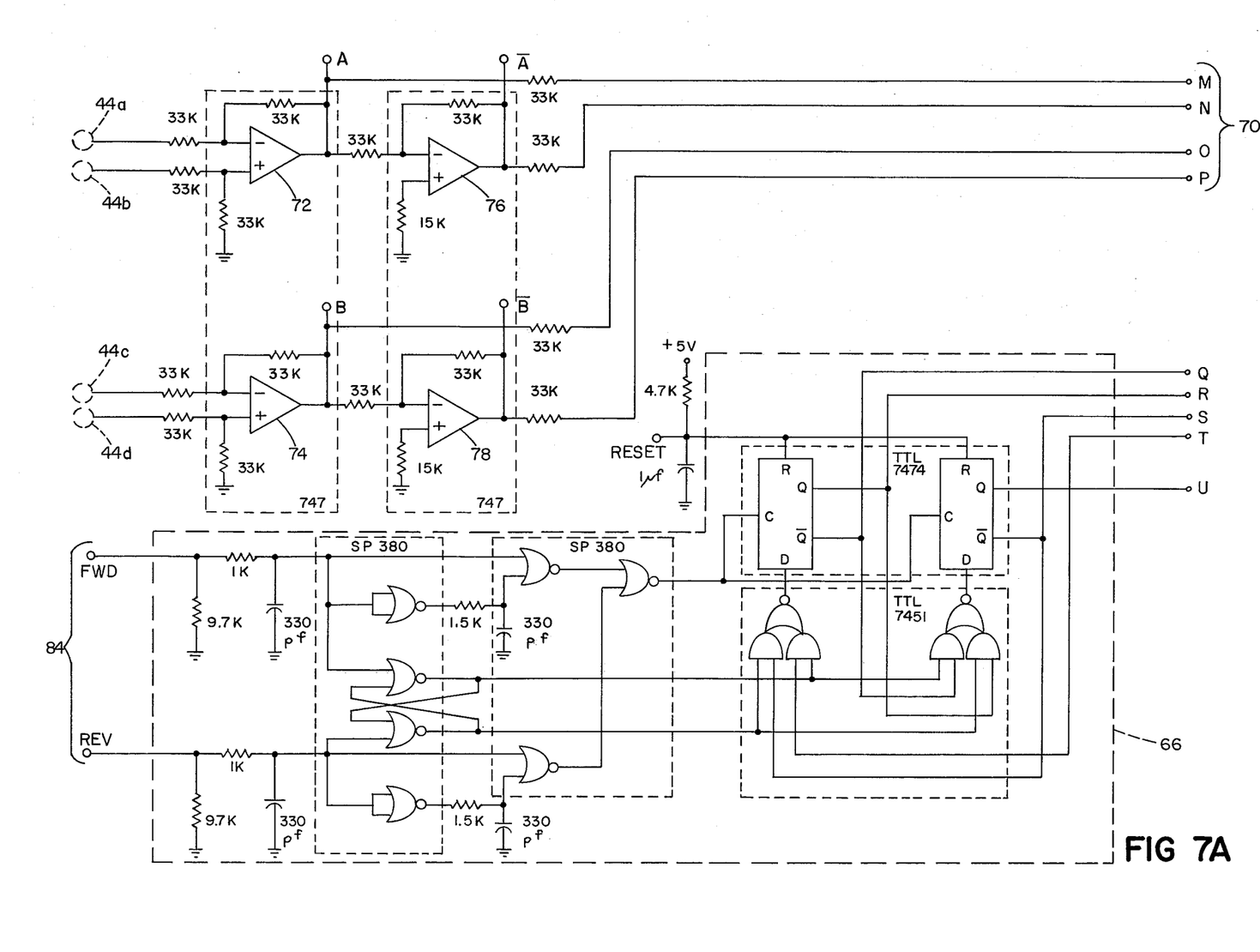
FIGS. 7A and 7B are schematic diagrams of the control means 14 of the apparatus of FIG. 1.
Figure 7B:
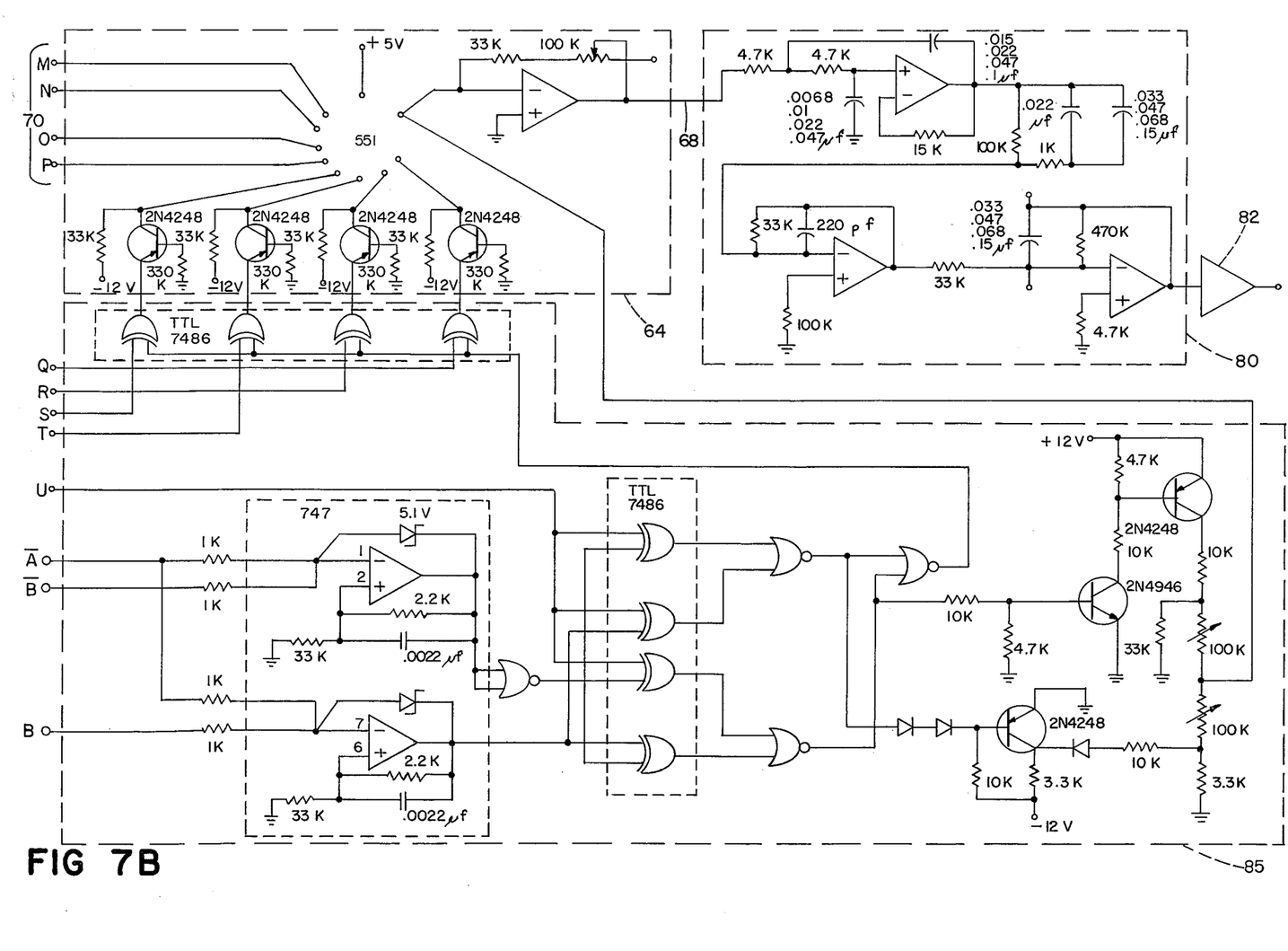

FIGS. 7A and 7B show one presently preferred circuitry arrangement for achieving the feedback loop 14 functions and performance described above. As indicated, Series 7400 TTL integrated circuit chips and Signetics, Inc. SP380 "Utilogic II" elements have been employed where suitable.

While a particular preferred embodiment of the invention has been illustrated in the drawings and described in detail here, other embodiments are within the scope of the invention and the following claims.

What is claimed is:
1. Apparatus for moving an electrical motor's rotary member, the apparatus comprising
    a plurality of optical channels each comprising a source of light and a light detector capable of producing an output voltage which varies in a predetermined way with changes in light flux striking the detector;
    a movable light mask having an axis of rotation, linked to said rotary member for rotation therewith, and disposed for rotation intermediate the source and detector of each said optical channel, said mask comprising a plurality of alternating transparent and opaque regions disposed symmetrically about said axis of rotation; and
    control means connected to receive the output voltages of said detectors and to cause operation of said electrical motor for rotation of said rotary member until a first predetermined set of detector outputs occurs, and after a predetermined time lapse to cause operation of said electrical motor for rotation of said rotary member until a second predetermined set of detector outputs results, and continuously to cause a series of such alternating rotations and time lapses;
    said optical channels being paired, the detectors of each pair of channels being angularly spaced apart with respect to said light mask axis by a predetermined angle such that at all times when the output voltage of each detector of said pair of optical channels is changing the output voltage of one will be increasing and the output voltage of the other will be decreasing,
    said transparent and opaque regions being equiangular and said predetermined angle of detector separation being approximately

$$\theta = S(2n + 1)$$

where $S$ = the angle subtended at said light mask axis by each said region and $n = 0, 1, 2, 3, \ldots$,
    each said predetermined set of detector outputs including equal outputs from the detectors of two paired optical channels, and
    said control means including means to subtract the smaller detector output voltage from the larger detector output voltage of two paired optical channels and to cause the resulting difference voltage to operate said electrical motor.

2. Apparatus as claimed in claim 1 wherein said motor is a servomotor having a servoamplifier, said control means being connected to deliver said difference voltage as an input to said servoamplifier.

3. Apparatus as claimed in claim 1 wherein there are first and second pairs of optical channels, each detector of said second pair being angularly spaced from a detector of said first pair by an angle of approximately $$\phi = S(n + \tfrac{1}{2}).$$

4. Apparatus for moving an electrical motor's rotary member, the apparatus comprising
    a plurality of optical channels each comprising a source of light and a light detector capable of producing an output voltage which varies in a predetermined way with changes in light flux striking the detector;
    a movable light mask having an axis of rotation, linked to said rotary member for rotation therewith, and disposed for rotation intermediate the source and detector of each said optical channel, said mask comprising a plurality of alternating transparent and opaque regions disposed symmetrically about said axis of rotation;
    control means connected to receive the output voltages of said detectors and to cause operation of said electrical motor for rotation of said rotary member until a first predetermined set of detector outputs occurs, and after a predetermined time lapse to cause operation of said electrical motor for rotation of said rotary member until a second predetermined set of detector outputs results, and continuously to cause a series of such alternating rotations and time lapses; and,
    light collimating means comprising a fixed light mask intermediate the source of light and detector of equal optical channel, said fixed light mask comprising a transparent region aligned with the light path of the respective optical channel and an opaque region surrounding said transparent region,
    said optical channels being paired, the detectors of each pair of channels being angularly spaced apart with respect to said light mask axis by a predetermined angle such that at all times when the output voltage of each detector of said pair of optical channels is changing the output voltage of one will be increasing and the output voltage of the other will be decreasing.

5. Apparatus as claimed in claim 4 wherein each said source of light comprises a light emitting diode.

6. Apparatus as claimed in claim 4 wherein said rotary member and said light mask are co-axial and said light mask is secured to said rotary member for rotation therewith.

7. Apparatus for moving an electrical motor's rotary member, the apparatus comprising a plurality of optical channels each comprising a source of light and a light detector capable of producing an output voltage which varies in a predetermined way with changes in light flux striking the detector;

a movable light mask having an axis of rotation, linked to said rotary member for rotation therewith, and disposed for rotation intermediate the source and detector of each said optical channel, said mask comprising a plurality of alternating transparent and opaque regions disposed symmetrically about said axis of rotation; and control means connected to receive the output voltages of said detectors and to cause operation of said electrical motor for rotation of said rotary member until a first predetermined set of detector outputs occurs, and after a predetermined time lapse to cause operation of said electrical motor for rotation of said rotary member until a second predetermined set of detector outputs results, and continuously to cause a series of such alternating rotations and time lapses;

said optical channels being paired, detectors of each pair of channels being angularly spaced apart with respect to said light mask axis by a predetermined angle such that at all times when the output voltage of each detector of said pair of optical channels is changing the output voltage of one will be increasing and the output voltage of the other will be decreasing, and said control means comprising first means for producing the difference voltage from the detector outputs of each of said pair of channels, second means for producing the inverted voltage of each difference voltage, switching means for serially selecting the individual difference voltages and the individual inverted difference voltages in a predetermined timed sequence, and means for driving said electrical motor until the selected voltage reaches a predetermined value.

8. Apparatus for moving an electrical motor's rotary member, the apparatus comprising a plurality of optical channels each including a light detector capable of producing an output voltage which varies in a predetermined way with changes in light flux striking the detector;

a movable light mask having an axis of rotation, linked to said rotary member for rotation therewith, and disposed for rotation intermediate the source and detector of each said optical channel, said mask comprising a plurality of alternating transparent and opaque regions disposed symmetrically about said axis of rotation; and control means connected to receive the output voltages of said detectors and to cause operation of said electrical motor for rotation of said rotary member until a first predetermined detector output voltage occurs or a predetermined time interval lapses, then to cause operation of said electrical motor for rotation of said rotary member until a second predetermined detector output voltage occurs or a second predetermined time interval lapses, and then continuously to cause a series of such rotations;

said control means comprising first means for producing an output voltage from the detector output of each of said channels, second means for producing the inverted voltage of each output voltage, switching means for serially selecting the individual output voltages and the individual inverted output voltages in a predetermined timed sequence, and means for driving said electrical motor until the selected voltage reaches a predetermined value.

9. Apparatus as claimed in claim 8 wherein said predetermined output voltages are zero.

10. Apparatus as claimed in claim 9 wherein said control means further include means for inverting the selected individual output voltage or individual inverted output voltage and for adding thereto a constant of twice the peak value of the selected voltage.

11. Apparatus for moving an electrical motor's rotary member, the apparatus comprising a plurality of optical channels each comprising a source of light and a light detector capable of producing an output voltage which varies in a predetermined way with changes in light flux striking the detector;

a movable light mask having an axis of rotation, linked to said rotary member for rotation therewith, and disposed for rotation intermediate the source and detector of each said optical channel, said mask comprising a plurality of alternating transparent and opaque regions disposed symmetrically about said axis of rotation;

control means connected to receive the output voltages of said detectors and to cause operation of said electrical motor for rotation of said rotary member until a first predetermined set of detector outputs occurs, and after a predetermined time lapse to cause operation of said electrical motor for rotation of said rotary member until a second predetermined set of detector outputs results, and continuously to cause a series of such alternating rotations and time lapses; and, compensating means for altering the angular orientation of said rotary member at which a said predetermined set of detector outputs will result thereby a compensate for minor nonuniformities among components of the apparatus, said optical channels being paired, the detectors of each pair of channels being angularly spaced apart with respect to said light mask axis by a predetermined angle such that at all times when the output voltage of each detector of said pair of optical channels is changing the output voltage of one will be increasing and the output voltage of the other will be decreasing.

12. Apparatus as claimed in claim 11 wherein said compensating means comprise means for altering the intensity of light emitted from at least one said source of light.

13. Apparatus as claimed in claim 11 wherein said compensating means comprise a variable gain amplifier connected to amplify the voltage of a said detector output.

14. Apparatus as claimed in claim 11 wherein light collimating means are provided, said collimating means comprising a fixed light mask intermediate the source of light and the detector of each said optical channel, said fixed light mask having a transparent region generally aligned with each optical channel, said compensating means comprising means for altering the angle between the respective transparent regions associated with a said pair of optical channels.

15. Apparatus simulating a stepper motor, the apparatus comprising a servomotor having a servoamplifier, a rotor, and a shaft secured to said rotor;

a plurality of optical channels each comprising a source of light and a light detector capable of producing an output voltage which varies in predetermined way with changes in light flux striking the detector;

a movable light mask having an axis of rotaton, linked to said shaft for rotation therewith, and disposed for rotation intermediate the source and detector of each said optical channel, said mask comprising a plurality of alternating transparent and opaque regions disposed symmetrically about said axis of rotation; and control means connected to receive the output voltages of said detectors and to deliver a drive voltage to said servoamplifier until a first predetermined set of detector outputs results and, after a predetermined time lapse, to deliver another drive voltage to said servoamplifier until a second predetermined set of detector outputs results, and continuously to cause a series of such alternating drive voltages and time lapses;

said optical channels being paired, the detectors of each pair of channels being angularly spaced apart, with respect to said light mask axis, by a predetermined angle such that at all times when the output voltage of each detector of said pair of optical channels is changing, the output voltage of one will be increasing and the output voltage of the other will be decreasing.

16. Apparatus simulating a stepper motor, the apparatus comprising a servomotor having a servoamplifier, a rotor, and a shaft secured to said rotor;

a source of light;

a plurality of optical channels each including a light detector capable of producing an output voltage which varies in a predetermined way with changes in light flux striking the detector;

a movable light mask having an axis of rotation, linked to said shaft for rotation therewith, and disposed for rotation intermediate said source and said detectors, said mask comprising a plurality of alternating transparent and opaque regions disposed symmetrically about said axis of rotation; and control means connected successively to receive the output voltages and the inverted voltages of the output voltages of said detectors and to deliver a respective drive voltage to said servoamplifier in response to each of said output voltage and said inverted voltages received, said control means being operative to deliver a first said drive voltage in response to a received first one of said output voltages and said invertedvoltages until said received first one reaches a predetermined level or a first predetermined time interval lapses, and thereafter to deliver a second said drive voltage in response to a received second one of said output voltages and said inverted voltages until said received second one reaches a predetermined level or a second predetermined time interval lapses, and thereafter to deliver a third said drive voltage in response to a received third one of said output voltages and said inverted voltages until said received third one reaches a predetermined level or a third predetermined time interval lapses and thereafter to deliver a fourth said drive voltage in response to a fourth one of said output voltages and said inverted voltages until said received fourth one reaches a predetermined level or a fourth predetermined time interval lapses, and thereafter continuously to receive successive ones of said output voltages and said inverted voltages and to cause a series of such drive voltages.

17. Apparatus as claimed in claim 16 wherein each of said predetermined output voltages is zero.

18. Apparatus as claimed in claim 16 wherein said control means further include means for inverting the selected individual output voltage or individual inverted output voltage and for adding thereto a constant of twice the peak value of the selected voltage.

* * * * *